United States Patent [19]
Hinke et al.

[11] Patent Number: 6,063,348
[45] Date of Patent: May 16, 2000

[54] FLUE GAS SCRUBBING AND WASTE HEAT RECOVERY SYSTEM

[75] Inventors: Joseph Hinke; Thomas V. Hinke, both of Ottawa, Canada

[73] Assignee: Thermal Energy International Inc., Canada

[21] Appl. No.: 08/842,639

[22] Filed: Apr. 16, 1997

Related U.S. Application Data

[63] Continuation-in-part of application No. 08/452,671, May 30, 1995, abandoned.

[51] Int. Cl.$^7$ .................................................. B01D 53/56
[52] U.S. Cl. ........................................... 423/235; 423/219
[58] Field of Search ...................... 423/235, 219

[56] References Cited

U.S. PATENT DOCUMENTS

| | | | |
|---|---|---|---|
| 3,033,653 | 5/1962 | Brautiggm | 423/322 |
| 4,178,357 | 12/1979 | Stoddard | 423/522 |
| 5,023,064 | 6/1991 | Burgess | 423/243.08 |
| 5,106,601 | 4/1992 | Chang | 423/235 |
| 5,284,636 | 2/1994 | Goff et al. | 423/235 |
| 5,348,715 | 9/1994 | Chang | 423/235 |

OTHER PUBLICATIONS

Mellor, "Organic and Theoretical Chemistry", 1947, pp. 740–744.
Toy, "Phosphorus", in "comprehensive Inorganic chemistry", 1973, pp. 394–395.

*Primary Examiner*—Wayne Langel
*Assistant Examiner*—Peter DiMauro
*Attorney, Agent, or Firm*—Andrus, Sceales, Starke & Sawall

[57] ABSTRACT

A system and method for the reduction of $NO_x$ in a flue gas are disclosed. A $P_4$ in water liquid/liquid emulsion is injected into a flue gas having a temperature of about 180° C. to about 280° C. to induce phosphorus-accelerated oxidation of the NO in the flue gas. $NO_2$ and phosphorus oxides are subsequently removed from the flue gas stream at a location sufficiently downstream of the injection site that the oxidation of NO in the flue gas is substantially complete prior to the removal of $NO_2$. This significantly improves the $NO_x$ recovery rate of the present system and method over those of the prior art. The system can be retrofitted to the waste gas stream of any stationary combustion source regardless of the fuel burned. The system is advantageously used in connection with a wet scrubber for the removal of $NO_2$ and other water soluble flue gas components. Injection of the emulsion results in the creation of ozone by means of the controlled oxidation of white phosphorus. The ozone reacts with nitrogen oxide (NO), which generally accounts for 90% of flue gas $NO_x$, to produce nitrogen dioxide ($NO_2$). The reaction products ($NO_2$ and the $P_4O_{10}$) can be removed from the flue gas together with $SO_2$ and particulates in the wet scrubber wherein they are efficiently transferred from the gaseous phase to the buffered scrubbing liquid. In the scrubber, the temperature gradient is preferably set through the dew point, so that it recovers both latent as well as sensible heat energy from the flue gas which energy can be sold to commercial or residential consumers to recover at least a part of the capital costs (purchase and operation) associated with the system.

9 Claims, 4 Drawing Sheets

FLUE GAS SCRUBBING AND WASTE HEAT RECOVERY SYSTEM

This is a continuation in part of application Ser. No. 08/452,671, filed May 30, 1995, now abandoned.

FIELD OF THE INVENTION

The present invention relates to flue gas scrubbing systems. More particularly, the invention relates to scrubbing systems for the removal of undesirable air pollutants (e.g. particulates, acid rain gases, organic toxins, odours, etc.), especially nitrogen oxides ($NO_x$), from a flue gas exhaust stream produced, for example, by industrial/commercial/institutional (ICI) boilers.

BACKGROUND OF THE INVENTION

The incentive to develop a cost-effective technology designed to reduce $NO_x$ emissions from all stationary combustion sources was provided in 1990 through the enactment by the U.S. Congress of the Clean Air Act Amendments (CAAA). A recent publication (EPA-453/R-94-022) by the Environmental Protection Agency (EPA) clearly indicates that the new $NO_x$ reducing timetable is to be applied to ICI boilers (which range in heat input size from 0.4 to 1,500 MBtu/hr), specifically those that emit over 25 tons of $NO_x$ per year. Such an annual $NO_x$ emission rate can be achieved, for example, by an oil burning furnace rated at 5 MW or a gas-burning furnace rated at 10 MW.

A number of methods are known for the reduction of $NO_x$ emissions in existing boilers. Modifications in the combustion process are usually the simplest and cheapest. Typical examples are a) to switch to a low N-containing fuel; b) to minimize the use of excess air; c) to lower the combustion temperature by injecting water or steam; d) to decrease the residence time in the flame zone; e) to recirculate and reburn all or part of the flue gases; f) to install an after burner; or g) to retrofit with a new low $NO_x$ burner. Other $NO_x$ reducing technologies involve some form of treatment of the flue gases. The three main sub-groups are a) the selective catalytic reduction (SCR) or the selective non-catalytic reduction (SNCR) reaction between $NO_x$ and ammonia (or urea) to $N_2$; b) the wet scrubbing of the gas stream with an oxidant (to convert NO to the soluble $NO_2$ or with a NO-specific absorber; or c) the creation of short lived but highly reactive free radicals by means of electrical discharge.

The retrofit technology currently most popular with owners of ICI boilers, in terms of $NO_x$ reduction, is the triple modification involving a change to natural gas, installation of a new low $NO_x$ burner, and recirculation of the flue gas for a reburn. The selective catalytic reduction installation (SCR) is also a popular flue gas treatment technology, despite its high installation costs. The SCR technology is currently recognized both by the industry and the EPA as the Best Available Technology (BAT) because it is able to reduce $NO_x$ emissions from both gas-fired and oil-fired boilers by over 80%.

Non-catalytic $NH_3$ induced $NO_x$ reduction (SNCR) replaces SCR when coal is burned or when high-sulfur containing fuels are used. The main advantage to SNCR over SCR is that it is twice as cost effective even though it generally does not achieve $NO_x$ reductions better than 60%. Its main disadvantage is that it requires high flue gas temperatures, generally above 800° C., whereas most ICI boilers are now equipped with economizers which reduce the flue gas temperature to 300° C. or less.

The effect of applying an electrical discharge to flue gases, e.g. pulsed corona discharge, dielectric barrier discharge, DC glow discharge, E-beam, etc. has been researched with the intention to use the short lived free radicals produced thereby for the reaction with $NO_x$ molecules. That process reduces most of the $NO_x$ to $N_2$ without also reducing the $CO_2$ molecules to CO. However, installation and operating and maintenance costs appear to impede commercialization of that technology. It is a further disadvantage that the electrical discharge produces the OH radical (as well as O, H, $O_3$ radicals) which reacts with CO and $N_2$ to produce the NO, possibly leading to an increase rather than a decrease in $NO_x$.

It is a major disadvantage of all the above-described measures and systems for the reduction of $NO_x$ emissions that they require either non-recurring or constant, non-recoverable capital expenditures. Thus, a more economical $NO_x$ emissions reduction method and system is desired.

The creation of oxygen radicals (O or $O_3$) during the oxidation of yellow phosphorus ($P_4$) has been common knowledge for many years (Thad D. Farr, Phosphorus. Properties of the Element and Some of its Compounds, Tennessee Valley Authority, Wilson Dam, Ala., Chem. Eng. Report #8 1950; J. R. Van Wazer, Phosphorus and its Compounds, Interscience, New York 1958). The suggestion to introduce $P_4$ into the spray of a wet scrubber to oxidize NO to $N_2$ in the flue gas stream from a boiler was made by S. G. Chang and G. C. Liu (Nature 343:151–3, 1990).

In U.S. Pat. No. 5,106,601 of Chang et al a wet scrubbing process for the removal of $NO_x$ from flue gases, wherein the flue gas is treated in a spray tower scrubber or a bubbling absorber with an aqueous emulsion of yellow phosphorus in water. The process is described as being operative throughout the liquid range of water with an optimal temperature range being 45° C. (113° F.) to 75° C. (167° F.) for the scrubbing emulsion. Although Chang et al. achieve significant reduction of $NO_x$ in the flue gas, the amount of scrubbing liquid and, thus, $P_4$ required to achieve $NO_x$ reductions above those of the prior art processes mentioned above are relatively high. Since the cost of yellow phosphorus is significant ($1 per lb), the use of large amounts of scrubbing liquid is uneconomical and renders the wet scrubbing process of Chang et al. unpractical for large scale industrial applications. Thus, a flue gas treatment process is desired which would provide for significant reductions in $NO_x$ concentration without the use of large amounts of phosphorus.

The location of the $P_4$/NO interaction in the spray of the scrubber as suggested by Chang et al. makes it difficult to ensure total confinement of all undesirable reaction products, i.e. ozone and phosphorus oxides. Furthermore, the $P_4$/NO interaction in the liquid/gas interface in a wet scrubber makes it difficult to achieve the optimum P/N molar ratio necessary for cost effectiveness. Other problems with the suggested inclusion of $P_4$ in the liquid spray of a wet scrubber are that the reservoir at the bottom of the wet scrubber cannot contain excess $P_4$ if the reservoir is to be clarified or filtered and that the efficiency of the reaction between the oxygen radicals and the NO molecules is dependent on the residence time of the reactants in the spray tower. Finally, the reactions which take place between $P_4$ and NO are believed to occur in the vapour phase. Thus, the inclusion of the phosphorus in the scrubbing liquid of a wet scrubber would significantly reduce the interaction between the reactant involved and result in longer treatment times required for the same degree of $NO_x$ reduction.

U.S. Pat. No. 5,284,636 (Goff et al.) is directed to another process employing phosphorus injection. However, Goff et al. are primarily concerned with the stabilization of heavy metals in fly ash. Disclosed is a system wherein the heavy metals stabilization is achieved by adding elemental phosphorus to the flue gas or the fuel to produce phosphorus oxides. Goff et al. suggest that simultaneous heavy metal stabilization and $NO_x$ reduction can be achieved by injection of phosphorus into the flue gas stream at any place upstream of a particulate separator device. Various injection sites are disclosed which range from the precombustion zone to a wet scrubber downstream of the combustion zone. The suggested temperatures for the injection of phosphorus range from 60° F. (16° C.) to 2500° F. (1371° C.). The temperature of the disclosed process is said to be limited by restrictions on materials of construction and not by the chemistry of the elemental phosphorus oxidation. Phosphorus is introduced either as an oxide species or directly as elemental yellow phosphorus. In the latter case, the elemental phosphorus is injected in the form of a water slurry including finely dispersed particles of solid elemental yellow phosphorus. The amount of phosphorus injected in the process is said to be dependent on the amount of fly ash produced and especially the concentration of heavy metal ions in the ash. The primary focus of Goff et al. is the use of phosphorus to produce oxides which when exposed to heavy metals such as Pb and Cd will interact to produce insoluble metal salts. Although the possibility of $NO_x$ reduction is mentioned, the specific reaction mechanism involved is not disclosed nor are the reaction conditions. The generation of ozone upon phosphorus injection into the flue gas and its involvement in the reduction of the $NO_x$ content of the flue gas is not even acknowledged. The ozone produced is not utilized at all in the stabilization of heavy metals. However, it is an extremely hazardous by-product if allowed to escape into the atmosphere and potentially more hazardous in the long run than the heavy metals entrapped. Goff et al. are silent on the effect of the ozone invariably produced upon injection of phosphorus into the flue gas. The survival times of ozone at the various injection sites disclosed and the possible quantities that could be released into the atmosphere through the stack are not discussed. Comparatively large amounts of phosphorus are used which renders the process uneconomical for $NO_x$ removal and, depending on the phosphorus injection site, the temperature of the flue gas at injection, and the method of particulate removal employed, may lead to potentially hazardous amounts of ozone being emitted to the atmosphere. Ozone is one of the most potent toxins known to man. Thus, a more economical and safe $NO_x$ removal process is desired.

SUMMARY OF THE INVENTION

It is now an object of the present invention to provide a more economical and environmentally safe process for the reduction of $NO_x$ in a flue gas which overcomes the above technological and economical problems.

It is another object of the invention to provide a process for the reduction of $NO_x$ using phosphorus injection, wherein the amount of phosphorus required per unit of flue gas is minimized and the emission of potentially hazardous by-products, such as ozone, is substantially prevented.

It is a further object of the invention to provide a process wherein the $NO_x$ reduction is combined with waste heat recovery in order to further reduce operating costs.

The problems described above in relation to the prior art $NO_x$ removal processes are now overcome with the process in accordance with the invention wherein a parallel oxidation of $P_4$ and NO is carried out in the vapour phase of the flue gas in the gas manifold of a boiler and upstream of any wet scrubbing steps and at a temperature of about 180° C. (356° F.) to about 280° C. (536° F.). This improves the safety and economy of the process by optimizing the $P_4$/NO interaction in the vapour phase and allows better process control with respect to hazardous bi-products, especially ozone.

In a further aspect, the invention provides for a more economical pollution control by combining downstream wet scrubbing operations with waste heat recovery.

It is yet a further object of the invention to provide a total pollution control and waste heat recovery system which permits the continued removal of $SO_x$ and particulates and which allows for the recovery of associated capital expenditures.

Accordingly, the invention provides a process for reducing the $NO_x$ content of a flue gas, which includes the steps of preparing an emulsion of liquid $P_4$ in water;

finely dispersing a metered amount of the emulsion in the flue gas at a location of injection, the location of injection being selected such that the temperature of the flue gas after injection of the metered amount is between 180° C. and 280° C., and the metered amount being selected according to the temperature of the flue gas at the location of injection so that the water phase of the emulsion substantially completely evapourates upon contact with the flue gas to initiate a parallel oxidation of $P_4$ and NO in the vapour phase of the flue gas;

removing $NO_2$ from the flue gas at a selected distance downstream from the location of injection by subjecting the flue gas to a wet scrubbing step, the distance being selected such that the parallel oxidation reaction is separated in time and space from the wet scrubbing step.

In a preferred embodiment, the process includes the further step of adjusting the flue gas temperature to the range of about 180° C. to about 280° C. prior to dispersing the emulsion in the flue gas. The temperature of the flue gas is preferably upwardly adjusted by injection of superheated steam upstream of the location of injection and downwardly adjusted by adding ambient air to the flue gas upstream of the location of injection, or by increasing the ratio of water in the emulsion and increasing the metered amount, while maintaining the amount of $P_4$ injected per unit volume of flue gas and ensuring that the water phase of the emulsion substantially completely evapourates upon contact with the flue gas.

The emulsion is preferably prepared by heating solid $P_4$ in a water bath to prevent contact of the phosphorus with air and admixing the liquefied $P_4$ with water in a preselected ratio and under a $N_2$ atmosphere. The emulsion is preferably dispersed in the form of microdroplets having an average diameter of 60 µm or less and in a spray profile selected to minimize contact of the $P_4$ with the manifold.

In yet a further preferred embodiment of the invention, the process includes the further step of monitoring for the presence of $P_4$ and $O_3$ in the exhaust of the scrubber and decreasing the amount of $P_4$ injected at the injection point if $P_4$ and/or $O_3$ are detected.

In another aspect, the invention provides an apparatus for reducing the $NO_x$ content of a flue gas in a flue gas manifold, which includes means for preparing an emulsion of liquid $P_4$ in water;

means for finely dispersing a metered amount of the emulsion in the flue gas manifold at a location of injection;

means for adjusting the temperature of the flue gas in an upstream portion of the manifold immediately upstream of the location of injection such that the temperature of the flue gas after injection of the metered amount of emulsion is in the range of about 180° C. to about 280° C.;

means for adjusting the metered amount according to the temperature of the flue gas at the location of injection so that the water phase of the emulsion substantially completely evapourates upon contact with the flue gas to initiate a parallel oxidation of $P_4$ and NO in the vapour phase of the flue gas; and wet scrubbing means connected to the manifold for removing $NO_2$ from the flue gas at a distance downstream from the location of injection, the length of the manifold between the location of injection and the means for removing $NO_2$ being selected such that the parallel oxidation reaction is separated in time and space from the wet scrubbing step.

The wet scrubbing means is preferably a wet scrubbing tower and the means for injecting is preferably an atomizer nozzle positioned in the flue gas manifold, most preferably a nozzle which is shaped and constructed to disperse the emulsion as microdroplets having an average diameter of 60 $\mu$m or less and to disperse the emulsion in a spray profile selected to minimize contact of the $P_4$ with the manifold.

In a preferred embodiment, the apparatus further includes monitoring means for detecting the temperature and NO content of the flue gas at the point of injection, and the means for preparing the liquid emulsion include a mixing control means for controlling the $P_4$/water ratio. A central controller is provided for automatically operating the mixing control means and the means for dispersing, to optimize the $P_4$/water ratio and the metered amount of emulsion according to the temperature and NO content detected by the monitoring means.

In another preferred embodiment, the apparatus further includes exhaust monitoring means for detecting the $P_4$ and $O_3$ content of the flue gas at an exhaust of the scrubber, the exhaust monitoring means being connected to the central controller for automatic adjustment of the $P_4$/water ratio and/or the metered amount when $P_4$ and/or $O_3$ is detected at the exhaust.

The means for preparing the $P_4$ in water emulsion preferably includes a heated water bath for melting solid phosphorus stored in a container, the container being completely submersible in the bath to prevent contact of the phosphorus with air, an emulsion tank sealed from ambient, a means for supplying liquefied phosphorus from the container to the emulsion tank, and means for admixing the liquefied phosphorus with water at a preselected ratio and in the emulsion tank. In the preferred embodiment, the system preferably further includes means for washing the liquefied $P_4$ with a solution of an acid-dichromate to remove trace contaminants.

The scrubbing tower preferably includes a sump for collecting spent scrubbing liquid and a scrubbing liquid conditioning circuit for recovering from the scrubbing liquid heat energy taken up from the flue gas.

The flue gas is preferably contacted in the scrubbing tower with an aqueous scrubbing liquid for removal of $NO_2$ and phosphorus oxides.

The scrubbing tower preferably includes a wet scrubbing tower having a flue gas treatment chamber, a flue gas entry port for introducing the flue gas into the treatment chamber, a spray assembly for introducing scrubbing liquid into the stream of flue gas in the treatment chamber, a scrubbing liquid sump for collecting used scrubbing liquid, and an exhaust for treated flue gas.

BRIEF DESCRIPTION OF THE DRAWINGS

Other aspects and advantages of the invention will become apparent from the following detailed exemplary description of the preferred embodiment, reference being made to the drawings, wherein.

DETAILED DESCRIPTION OF THE PREFERRED EMBODIMENT

In the preferred embodiment of the process of the present invention, the $NO_x$ content in the flue gas of a boiler, furnace, or incinerator is reduced by carrying out a parallel oxidation of $P_4$ and $NO_x$ in the vapour phase of the flue gas. The oxidation is initiated upon exposure of $P_4$ in the vapour phase to $O_2$ after $P_4$ is injected into the flue gas stream. The $P_4$ is injected in the form of an aqueous emulsion of liquid yellow phosphorus. The ratio of water to $P_4$ and the amount of emulsion is selected according to the flue gas throughput, the flue gas temperature and $NO_x$ content so that the water phase of the emulsion is substantially instantaneously evapourated upon contact with the flue gas. The reaction products of the parallel oxidation which are phosphorous oxides and $NO_2$ are removed downstream by the solution in the scrubbing liquid of a wet scrubber. The emulsion injection point is selected in such a way that the parallel oxidation reactions are separated in space and time from the dissolution or wet scrubbing step so that the oxidation reaction is substantially complete before the reaction products, the phosphorous oxides and the $NO_2$, are dissolved in the scrubbing liquid of the downstream scrubber. The process is carried out in a manner to maximize the oxidation reaction and, thus, minimize the $P_4$ consumption per unit of flue gas treated. The inventors of the present process have found that the $P_4$ oxidation is maximized when carried out in the vapour phase where most of the $O_2$ molecules in the flue gas stream are located, rather than in the liquid phase of a scrubbing liquid as suggested in the prior art. Thus, in the process of the present invention, the $P_4$ is transferred to the vapour phase as quickly as possible. This is achieved by injecting the emulsion into flue gas of a temperature in the range of about 180° C. to about 280° C. which favours the $P_4$ vapourization and prevents conversion to the relatively unreactive red phosphorus, and by dispersing the emulsion so finely that the water phase of the emulsion substantially instantaneously evapourates upon contact with the flue gas. Finally, applicant has discovered that the kinetics of the parallel oxidation can be optimized and, thus, both the consumption of $P_4$ reduced and the loss of ozone to the atmosphere minimized by carrying out the oxidation reaction at a temperature where the $P_4$ vapour pressure and the $O_3$ decomposition rate are optimally correlated. Rather than permitting the $P_4$ oxidation to occur at 70° C. as suggested by Chang et al., where the $P_4$ partial pressure is 0.81 mm Hg, applicants have determined that the whole oxidation reaction can be carried out more efficiently if the $P_4$ oxidation was permitted to occur at about 180° C. to about 280° C., preferably about 250° C., where the $P_4$ partial pressure is 409 mm Hg, a 500 fold increase. This is achieved by injecting the emulsion at a location where the temperature of the flue gas is in this temperature range. Preferably, the injection point is selected such that the flue gas is in this specific temperature range after injection of the emulsion. If the flue gas does not reach a temperature within this range during passage through the flue gas manifold, the temperature of the flue gas is adjusted accordingly by either injecting superheated steam to increase the flue gas temperature or injecting ambient air to decrease the flue gas temperature. A decrease in the flue gas temperature can also be achieved by increasing the amount of water in the emulsion and increasing the emulsion injection rate, all without increasing the amount of phosphorus injected or exceeding the total amount of water which can evapourated upon emulsion injection.

The oxidation of NO to $NO_2$ is maximized in the vapour phase where most of the $O_3$ molecules are located during $P_4$ oxidation. Since this latter oxidation is both spontaneous and rapid, it can be expected to occur efficiently at temperatures (for example, 250° C.) where the half-life of $O_3$ is measured in seconds (rather than minutes at lower temperatures). However, as mentioned above, it is essential for environmental suitability of the process that little or no $O_3$ be permitted to exist at the downstream wet scrubbing location where temperatures are greatly reduced. Since $O_3$ is relatively insoluble, most of it would remain in the vapour phase during passage through a wet scrubber and would be permitted to the atmosphere at lower temperatures. However, since $O_3$ is more toxic than any of the $NO_x$ gases, the environment would be worse off.

Analysis by the applicant of the kinetics of the oxidation reactions and of the $O_3$ thermal decomposition rate indicate that there is a preferred temperature window from about 180° C. to about 280° C. in which one can expect to optimize the $P_4$ and $NO_x$ oxidations and minimize the possibility of ozone release in the exhaust.

The $NO_x$ gases consist of $N_2O$, NO, and $NO_2$. $N_2O$ converts spontaneously to $N_2$ early on when the manifold temperatures are 300° C. or greater, hence the concentration of $N_2O$ significantly decreases in the flue gas with increasing distance from the combustion zone. At 300° C., NO accounts for about 90% of the $NO_x$. However, due to the slow but spontaneous oxidation of NO to $NO_2$, this amount will slightly decrease with distance from the combustion chamber. The following reaction is believed to occur:

$$2NO + O_2 \rightarrow 2NO_2 \qquad \text{i.}$$

The degree of conversion depends on the $O_2$ content, the free O˙radical content, the CO content, the temperature, and the distance from the combustion chamber.

Theoretical calculations indicate that up to 90% of all $NO_x$ could be recovered by a wet scrubber if all of it were in the $NO_2$ form when it entered the tower. Chang & Lee (1992) have already demonstrated that the oxidation of NO to $NO_2$ inside a scrubber is accelerated when $P_4$ is permitted to oxidize in the same location. The following reaction chain is believed to occur:

$$P_4 + O_2 \longrightarrow P_4O + O' \qquad \text{iv.a}$$

-continued $$P_4O_n + O_2 \longrightarrow P_4O_{n+1} + O' \qquad \text{iv.b}$$

$$2NO + (O' + O_3) \longrightarrow 2NO_2 + O_2 \qquad \text{iv.c}$$

where n is a number from 1 to 9. These reactions are believed to occur primarily in the vapour phase. Therefore, adding $P_4$ to the scrubbing liquid spray in the tower as suggested in the prior art is disadvantageous.

The major distinction of the process of the present invention from the prior art discussed above, resides in the carrying out of the $NO_x$ and $P_4$ oxidation in the vapour phase and independent from any wet scrubbing steps rather than in a scrubbing liquid. The parallel oxidation is separated in time and space from the removal of the reaction products. This separation is achieved by insuring that substantially all of the water phase of the emulsion evapourates upon contact with the flue gas. The inventors of the present invention have discovered that this separation will maximize the $NO_x$ removal efficiency of the system of the invention and minimize the amount of $P_4$ required per unit of flue gas for removal of a given amount of $NO_x$.

The present inventors were the first to be concerned about possible emission of residual $O_3$ and $P_4$ in the treated flue gas exhausted to the atmosphere. It is known from the prior art that, theoretically, $O_3$ is produced during oxidation of $P_4$ which decomposes into $O_2$ and a radical O˙. That in turn reacts with and oxidizes NO. However, the prior publications mentioned above did not investigate the kinetics of that parallel oxidation nor did they question whether operation of the respective method would result in the emission of potentially harmful byproducts.

From the above chain reactions (iv), it is apparent that a tetrahedral $P_4$ molecule has the potential to produce 10 oxygen radicals which in turn have the potential to oxidize 10 molecules of NO. Thus, the best P/N molar ratio one can expect is 0.4. This theoretical optimium ratio can be achieved when the half-life ($t_{1/2}$) of the O radical (either $O^{19}$ or $O_3$ is such that it can survive long enough to collide with an NO molecule. The $t_{1/2}$ values listed below in Table 1 illustrate how dependent ozone survival is on temperature and ozone concentration (Kirk Othmer, "Encyclopedia of Chemical Technology", John Wiley & Sons, 2nd ed., Vol. 14;410–416, 1967).

TABLE 1

UNCATALYZED THERMAL DECOMPOSITION OF OZONE IN $O_3$ + $O_2$ MIXTURES

| $O_3/O_2$ Wt. % | | Initial Ozone Concentration | | | |
| Temp. | | 2 | 1 | 0.5 | 0.1 |
| °C. | K | Half-Life ($t_{1/2}$) of Ozone sec | | | |
| --- | --- | --- | --- | --- | --- |
| 150 | 1.40 | 105 | 210 | 420 | 2,100 |
| 200 | 0.030 | 2.25 | 4.5 | 9.0 | 45 |
| 250 | 0.00133 | 0.1 | 0.20 | 0.40 | 2 |

$(t_{1/2})=150K/(Wt \%)$ where K is a complex function of temperature and of the decomposing constant (k) of $O_3$ to $O_2$.

The inventors of the present application, after concentrating on the kinetics of the oxidation reaction, now have discovered that $NO_x$ removal can be maximized and $O_3$ emissions minimized by carrying out the parallel oxidation reaction not only in the vapour phase but at about 180° C. to about 280° C. for the following reasons. The vapour pressure of $P_4$ increases exponentially from 0.000233 to 1.0 atmosphere in the temperature range from the melting point (44° C.) to boiling (280° C.). Thus, it would theoretically be most desirable to carry out the parallel oxidation above 280° C. to ensure that all of the injected $P_4$ is immediately transferred to the vapour phase and rapidly oxidized. However, at temperatures above 280° C., the highly reactive tetrahedral phosphorous transforms into the amorphous red phosphorous which oxidizes much slower. Furthermore, the second aspect of the parallel oxidation is the reaction of NO with the O radical produced upon decomposition of $O_3$. To optimize the kinetics of that reaction, one must ensure a sufficient supply of $O_3$ for the oxidation of all NO present in the flue gas, especially since $O_3$ is relatively unstable. This could be achieved by simply increasing the amount of $P_4$ injected into the flue gas. However, economic factors prohibit the use of large amounts of $P_4$ and producing an over-stoichiometric amount of $O_3$ relative to the NO content of the flue gas may result in leftover, toxic $O_3$ being exhausted to the atmosphere, especially at low exhaust temperatures. The present inventors have determined that one of the key factors to an economic operation of a $P_4$ induced NO oxidation system is the decomposition rate of $O_3$ at different temperatures. The half-life of $O_3$ decreases exponentially with temperature. Thus, theoretically, it would be desirable to run the parallel oxidation at the lowest possible temperature to ensure that the $O_3$ is not fully decomposed before the oxidation of NO is complete. However, as discussed above, this would require the use of uneconomically large amounts of $P_4$ since the $P_4$ vapour pressure decreases exponentially with temperature. Furthermore, the half-life of $O_3$ below 150° C., for example, is a multiple of the residence time of the flue gas in the system (see Table I) so that the danger of $O_3$ being exhausted to the atmosphere, is high. To reduce the amount of phosphorous needed per unit of flue gas, and to minimize the emission of potentially dangerous byproducts such as ozone, the present inventors have determined that the parallel oxidation must be carried out in the vapour phase of the flue gas, separate from and prior to any wet scrubbing of the flue gas, and at a temperature in the range of about 180° C. to about 280° C. The above-discussed prior art in no way deals with the question of reaction products other than phosphorous oxides and $NO_2$. The above prior art references do not appreciate that the efficiency of the $NO_x$ removal is directly dependent on the temperature at which the parallel oxidation of $P_4$ and $NO_x$ takes place. The slow production and decomposition of ozone during oxidation of $P_4$ and the relatively low vapour pressure of the $P_4$, at temperatures below 150° C., can lead to ozone being emitted to the atmosphere and to insufficient amounts of the radical O being present for the completion of the parallel oxidation before wet scrubbing or emission to the atmosphere. Furthermore, the prior art also fails to appreciate that, since elemental phosphorous will convert from the highly reactive yellow phosphorous to the much less reactive red phosphorous at 280° C., and the ozone half-life becomes extremely short at above 280° C., practicing the parallel oxidation at temperatures above 280° C. which require the use of an economically high amounts of phosphorous for the oxidation of $NO_x$, if any. In other words, a temperature above about 280° C., and as high as 1371° C. (2500° F.) for removal of $NO_x$ from flue gas by addition of phosphorous to the flue gas, would be neither economical nor practical. This is also reflected in the relatively low $NO_x$ removal rates of about 50% achieved with the method disclosed in Goff et al., which is unacceptable for any system used specifically for $NO_x$ removal.

In the preferred process in accordance with the invention which is illustrated by way of a flow diagram in FIG. 2, an emulsion of liquid $P_4$ in water is produced by melting the phosphorus in a water bath and under an inert atmosphere, such as $N_2$, mixing the molten phosphorus with water in a manner as will be described in more detail below with reference to the apparatus of FIG. 1. The emulsion is then finely dispersed in a flue gas stream in such a way and amount that the water phase of the emulsion substantially immediately evapourates upon contact with the flue gas. The amount of the emulsion is also adjusted according to the NO content of the flue gas so that sufficient $P_4$ is injected for a complete ozone mediated oxidation of the NO in the flue gas. If the NO content of the flue gas remains substantially constant during operation of the flue gas producing burner the amount of emulsion injected is adjusted once according to the characteristics of the flue gas. If the burner load and, thus, the consistency of the flue gas varies, the amount of emulsion injected is adjusted continuously or intermittently according to the temperature and NO content of the flue gas as measured immediately above the point of injection of the emulsion with equipment as described in detail further below. It is important for an economical and safe operation of the process of the invention with respect to the ejection of unreacted $P_4$ and $O_3$ that the parallel oxidation of $P_4$ and NO is carried out at a temperature in the range of about 180° C. to about 280° C. This is achieved either by selecting an appropriate location in the flue gas manifold where the flue gas is at the desired temperature or by adjusting the flue gas temperature as required. Injection of the emulsion takes place upstream of a wet scrubbing tower 52 and the exact location is selected such that the parallel oxidation of $P_4$ and NO and the decomposition of $O_3$ is substantially complete prior to contact of the flue gas with the scrubbing liquid. The distance of the injection point from the scrubbing tower 52 can be calculated from the speed of the flue gas stream at the injection point (i.e. the volume flow of the flue gas and the manifold cross section) and the reaction time required for oxidation of the respective amount of NO present in the flue gas, which time can be determined from the information provided herein and especially in Table 1 and the Example described below.

The process of the invention and the preferred apparatus to carry out the process are now described in more detail with reference to FIGS. 1, 3 and 4. The preferred apparatus in accordance with the invention is shown schematically in FIG. 1 and includes a phosphorus handling and injecting system 10 and a wet scrubbing and waste heat recovery system 50. The phosphorus handling and injecting system consists of phosphorus storage and emulsifying stations A and B and a phosphorus emulsion injection arrangement C. The wet scrubbing and waste heat recovery system 50 includes a wet scrubbing tower 52 and a scrubbing liquid conditioning and heat recovery circuit 54.

Figure 1:
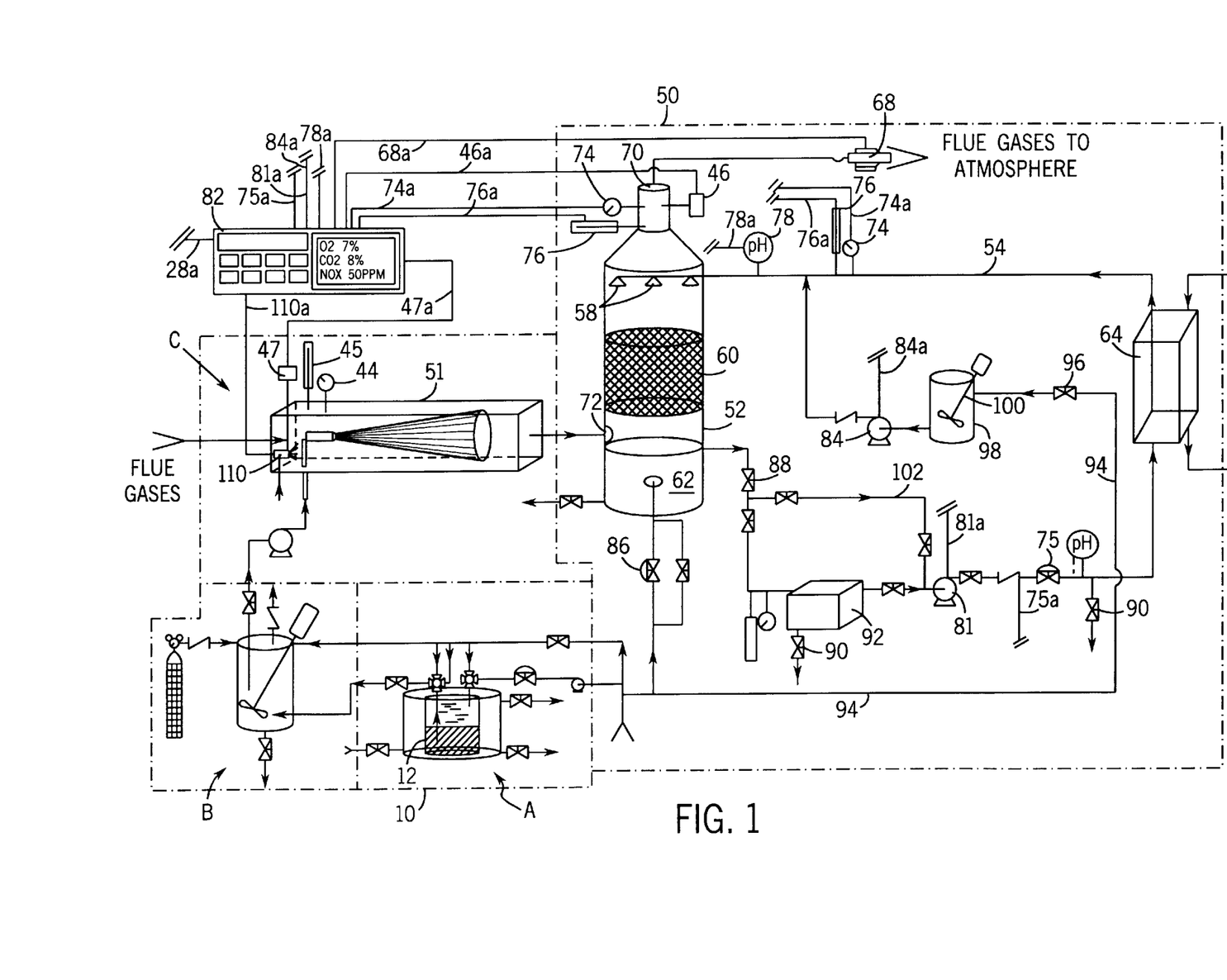
FIG. 1 is a schematic diagram of the preferred embodiment of an $NO_x$ emissions reduction system in accordance with the invention.
Figure 2:
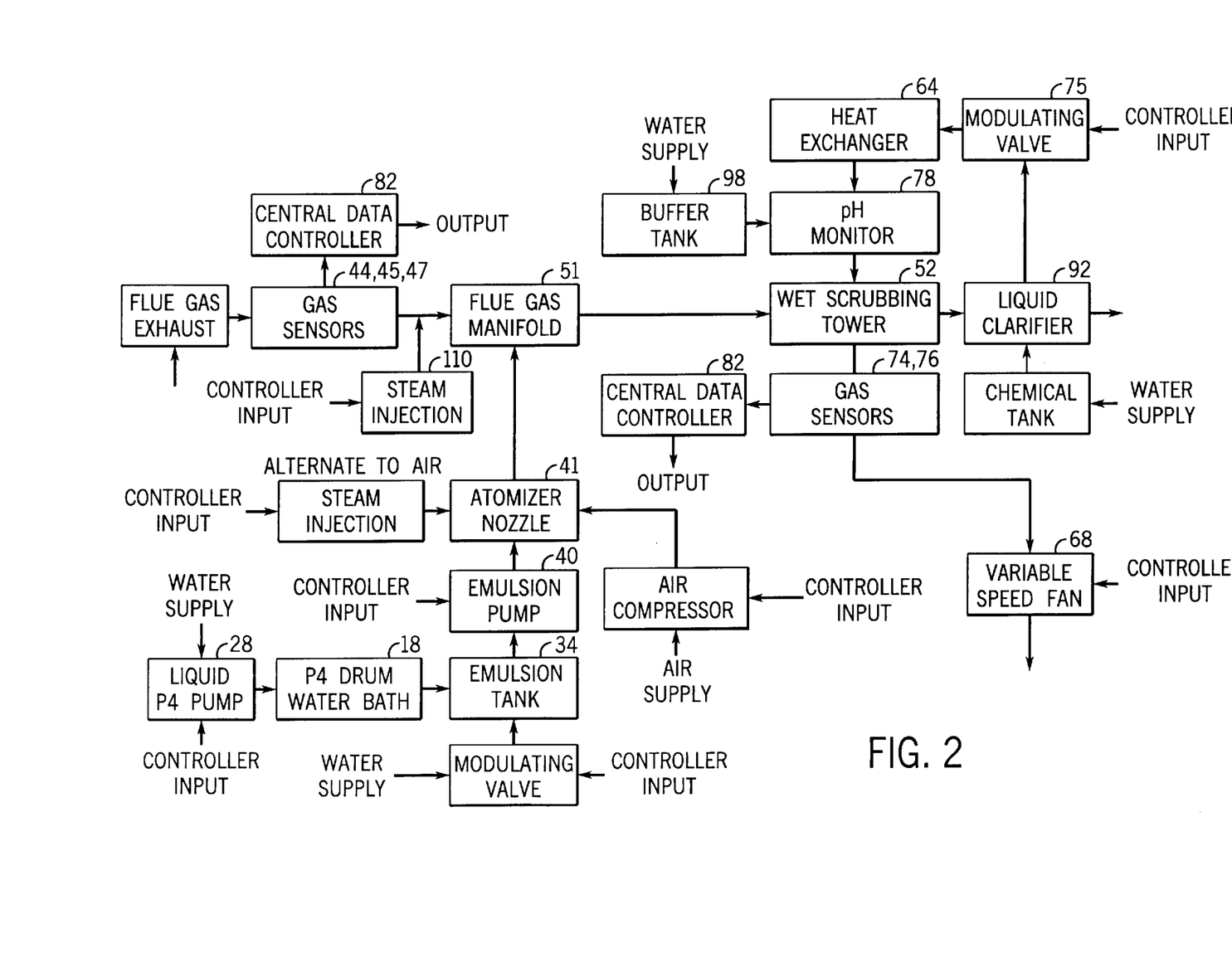
FIG. 2 is a schematic block diagram, illustrating the interaction of the components shown in FIG. 1 plus all accessory equipment related to monitoring and control of the key variables to maximize efficiency, safety and containment.
Figure 3:
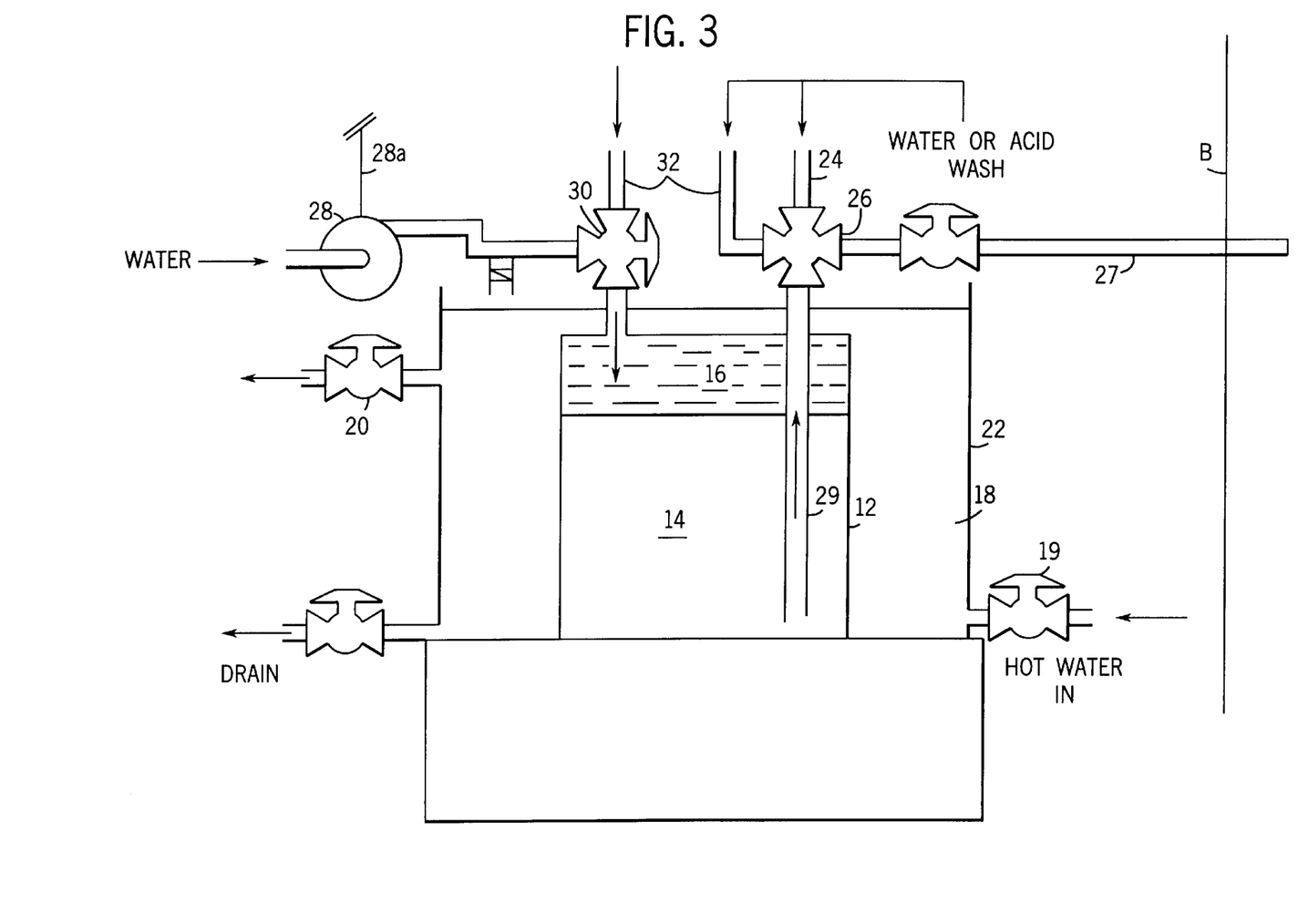
FIG. 3 is an enlargement of Section A in FIG. 1.
Figure 4:
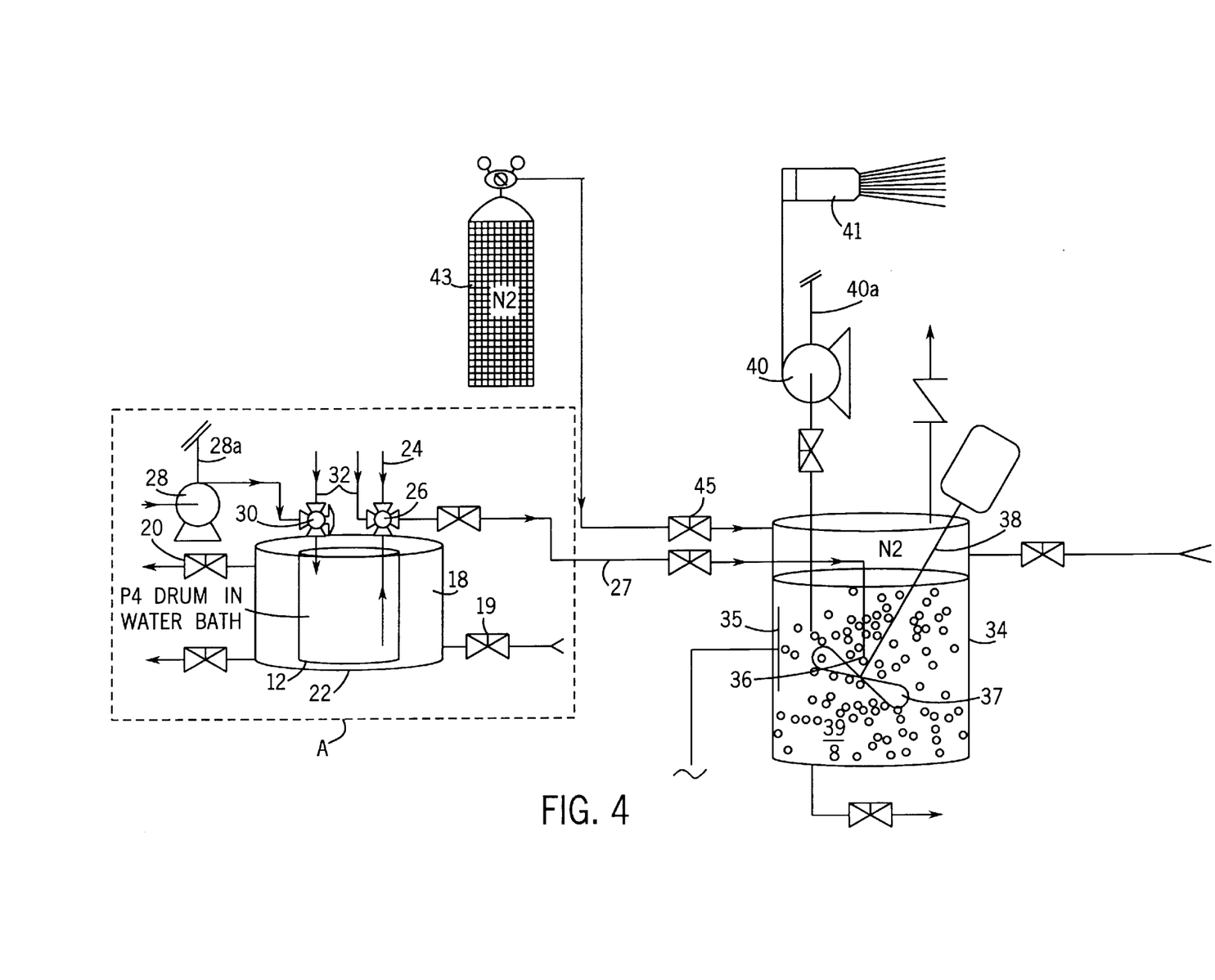
FIG. 4 is an enlargement of Section B in FIG. 1.

The stations of the phosphorus handling and injection system 10 designed for the storage, liquefaction, dilution, emulsification, delivery to the manifold, and atomization of the liquid $P_4$ in water emulsion which are shown schematically as apparatus units A, B, and C in FIG. 1 are shown enlarged in FIGS. 3 and 4 respectively.

White phosphorus is commercially available (Brander's, Baltimore, Md.) in 250 kg sealed drums 12 (see FIG. 3) containing 200 kg of solid phosphorus 14 layered with about 20 kg of water 16 (the density of solid $P_4$ is 1.828 g/cc). Before removing the generally threaded filler caps of the drum 12 to attach the plumbing connecting units A and B, it is preferred for safety reasons that the drum be totally immersed in a water bath 18. Besides ensuring no air contact with $P_4$ (when making connections), the water bath 18 also serves to warm the $P_4$ above its melting point (44.1 ° C.). For this purpose, the water bath 18 is maintained at a constant temperature of 50–55° C. Hot water at a temperature of 55°C. is supplied through an input valve 19 on one side and at the bottom of the water bath tank 22 and removed through an output valve 20 located opposite the input valve and at the top of the water bath tank. The water bath input and output connections are preferably welded to the tank 22 at such an angle that circulation of the water bath 18 is achieved. A pump (not shown) ensures adequate supply of heated water. The water bath 18 can be made large enough to hold several drums 12, the number will depend on the rate at which $P_4$ is utilized. The energy to heat the water bath 18 is obtained through a heat exchanger fed either by steam or incorporated into the heat recovery circuit 54 (see FIG. 1).

The liquefied $P_4$ is preferably washed with acid-dichloromate solution to remove impurities (As & oil) if required which solution is supplied through a washing solution pipe 24 and four-way valve 26. Liquid $P_4$ is transferred at a pre-determined rate from the drum 12 to the emulsifying station B through transfer pipe 27, four-way valve 26 and riser pipe 29 by displacing the liquid $P_4$ with water forced into the drum by way of a positive displacement metering pump 28 (Pump Tech Inc., Mississauga, Ontario) and three-way valve 30 to ensure the delivery of a predetermined constant flow to the emulsifying station.

Hot washing water can be supplied to the drum 12, the riser pipe 29, the transfer pipe 27 and the three-way and four-way valves 30, 26 through washing water supply pipes 32 for the flushing out of solidified $P_4$ from the plumbing. With duplication of the plumbing complex, the switch to a second tank 12 can be done quickly and efficiently.

An enlargement of the air-tight emulsifying station B is shown in FIG. 4. Liquid $P_4$ and water are pumped into emulsion tank 34 at predetermined constant flow rates designed to produce and to maintain a constant $P_4$/water dilution ratio (i.e. about 1:100 for a $NO_x$ emission rate of 300 ppm) and are emulsified therein by way of a conventional mixer 38. The unheated transfer pipe 27 (see FIG. 3) between the water bath 18 (>50° C.) and the emulsion tank 34 (>70° C.) is insulated to prevent cooling to below the solidification temperature of $P_4$ (45° C.). Transfer pipe 27 enters into the emulsion tank so that the $P_4$ outflow end 36 of the transfer pipe is directly above the stiffening paddle 37 of the mixer 38 to prevent settling of the heavy immiscible $P_4$ and ensure immediate emulsification of the two liquids. The temperature of the emulsion 39 is preferably maintained at 70° C. by way of a conventional immersion heater 35. The $P_4$/water emulsion 39 is conveyed at a preset rate by way of a conventional metering pump 40 (Pump Tech Inc., Mississauga, Ontario) to an atomizer nozzle 41 located in the flue gas stream in the intake manifold 51 of the wet scrubbing tower 52 (see FIG. 1). The emulsion is instantly dispersed by the nozzle 41 (TurboSonic Inc., Waterloo, Ontario) into microdroplets (<60 μm diam.) with or without the use of compressed air (or steam) supplied to the nozzle 41, which microdroplets are ejected into the flue gas stream. The compressed air is produced by a conventional air compressor (not shown) and according to specifications of the nozzle manufacturer. Selection of the atomizer nozzle 41 will depend on the geometry (angle distance, width, sectional profile) of the spray desired. Multiple orifice nozzles are commercially available (TurboSonic Inc., Waterloo, Ontario) which produce any spray profile (circular, square, rectangular) and with any set of dimensions so that the profile of the spray can be precisely tailored to the dimensions of any flue gas manifold. The intention in that respect is to prevent contact of the injected liquid $P_4$ with the manifold. The variables to be considered in selecting the atomizer nozzle are: a) the desired flow rate and temperature of the $P_4$/water emulsion 39; b) the flow rate and temperature of the flue gas stream in the manifold 51 as determined by way of flow and temperature sensors 44, 45; c) the pressure of the compressed air (or steam) supplied to the nozzle 41; and d) the number, size, shape, and grouping of the orifices in the nozzle.

The pump rate of metering pump 40 immediately upstream thereof is controlled by way of the central controller 82 through conductor 40a in order to maintain and match the rate of liquid entry to the rate of liquid exit in the emulsifying tank 34. The development of a negative pressure in the emulsifying tank 34 must be especially avoided since it encourages air entry during equipment failure (i.e. leakage of seals in pumps and valves). As a safeguard, that part of the tank above the emulsion 39 is kept filled with nitrogen gas ($N_2$) at a slightly positive pressure. A conventional modulating valve 45 is provided between the emulsion tank 34 and a $N_2$ tank 43 and is programmed to open when the pressure falls to zero and to close when a small positive pressure develops.

The scrubbing tower 52 removes water soluble gases (including acid gases and greenhouse gases) and particulates from the flue gas and functions also as direct contact gas-to-liquid heat exchanger. The primary scrubbing liquid is preferably water which is chemically treated and pH balanced and is introduced at the top of the tower 52 through spray nozzles 58. The scrubbing liquid then passes downward inside the tower 52, through a structured internal bed 60 (Glitsch, Canada) which provides a large surface for efficient mass and heat transfer. The scrubbing liquid collects in a sump 62 at the base of the tower 52. Hot flue gas is fed into the tower 52 above the sump through a flue gas inlet port 72 and flows upward counter to the downward flow of the scrubbing liquid. The temperature of the liquid is selected to permit water vapour condensation, hence the transfer of both latent and sensible heat from the flue gas to the scrubbing liquid. The heated scrubbing liquid is pumped from the sump 62 to a heat exchanger 64 (Nixon-Vicarb, Newmarket, Ontario). In transferring the liquid through the heat exchanger, the scrubbing liquid is cooled before it is recirculated back to the spray nozzles 58 at the top of the tower 52 while a cooling liquid also circulating through the heat exchanger 64 is heated to the same extent the scrubbing liquid is cooled. The heated cooling liquid can then be employed for the heating of the boiler plant or other buildings, for the preparation of hot utility water, or the like. The energy stored in the cooling liquid which is not used up in the boiler plant and in the scrubbing process, for example for the heating of the phosphorus as will be described in detail below, can be sold to commercial or residential consumers. This allows recovery over time of all or at least a substantial part of the operation and purchase costs of the scrubbing system. Thus, the heat recovery aspect of a system in accordance with the invention provides the system with a significant economical advantage over conventional flue gas scrubbing and especially $NO_x$ reduction systems which do not allow for amortization of the purchase, installation and operating costs through the sale of recovered energy. A variable speed exhaust fan 68 located at the exhaust 70 of the tower 52 is automatically controlled to vary the draft through the tower, thereby controlling static pressure and maintaining the required boiler operation parameters.

The scrubbing tower 52 is usually installed in close proximity to an existing smoke stack so that the flue gases can be most conveniently and economically redirected from the bottom of the stack (not shown) to the inlet port 72 of the tower. The scrubbing tower 52 is dimensioned to receive the full volume of the exhaust stream, to extract the maximal amounts of sensible and latent heat as the gases are cooled, preferably to 38° C., and to capture particulates, $SO_2$ and $NO_2$. The efficiency of these heat and mass transfers are dependent on the size of the gas/liquid surface interface in the scrubbing tower, the opposing countercurrent temperature gradients (decreasing upward for the gases, increasing downward for the liquid), the selection and maintenance of the liquid/gas ratio, the selection and maintenance of the final exhaust temperature, the selection of the buffer used for the control of the scrubbing liquid pH and the scrubbing liquid temperature.

Optimization of the pollution control and heat recovery process is achieved by a monitoring system which includes pressure and temperature sensors 74, 76, a pH sensor 78, (Base Controls, Newmarket, Ontario), the exhaust fan 68, a circulating pump 81 (Pump Tech Inc., Mississauga, Ontario) in the scrubbing liquid circuit 54, a central controller 82, the displacement metering pump 28 and a buffer liquid metering pump 84. The sensors 74, 76 and 78 are electrically connected through associated conductors 74a, 76a and 78a to the controller 82 for the transfer of signals representing the size of the variable respectively detected. The controller 82 in turn is electrically connected to the displacement metering pump 28, the exhaust fan 68, the circulating pump 81 and the metering pump 84 through associated conductors 28a, 68a, 81a and 84a for control of the $P_4$/water ratio in the emulsion the flue gas flow, the throughput of the scrubber liquid conditioning and heat recovery circuit 54 and the temperature and pH of the scrubbing liquid ejected from the spray nozzles 58 respectively according to parameters stored in the controller. The throughput of circuit 54 can also be controlled by an electrically controlled modulating valve 75 (Base Controls, Nepean, Ontario) connected to the controller through conductor 75a. Multiple heat exchangers 64 (not shown) can be provided in combination with a scrubbing liquid distribution arrangement (not illustrated) so that a sufficiently large heat sink is always available for the transfer of energy stored in the scrubbing liquid. Furthermore, to optimize the particulate and dissolved compound removal from the flue gas, the temperature and amount of the scrubbing liquid sprayed into the flue gas is controlled such that the final exhaust temperature is below the dew point (less than 50° C.). This allows for the capturing of both the sensible and the latent heat from the flue gas. If the temperature of the flue gas immediately upstream of nozzle 41, superheated steam injected through an electrically controlled steam nozzle 110 to achieve an increase in flue gas temperature. Alternatively, the water portion of the emulsion and the rate of injection of the emulsion is increased to achieve a decrease in temperature of the flue gas. This temperature occurs automatically, if required, by way of the central controller 82, steam nozzle 110 and displacement metering pump 28 and metering pump 84 and the associated conductors 110a, 28a and 84a. The sump 62 of the scrubbing tower receives the sprayed liquid plus the water vapour condensed from the flue gas. The liquid in the sump 62 also contains all the entrapped particulates and the dissolved gases, which were converted to acids and then neutralized by the buffer in the scrubbing liquid. The sump has a make-up water supply 86 and is preferably equipped with a conventional automatic ball float valve 88 for liquid level control. However, due to condensation of the water vapour originally in the flue gas stream, there is usually an excess of water in the sump relative to the requirements for scrubbing liquid recirculation. Thus, in general, some liquid is directed either continuously or intermittently to drainage through drainage valves 90. This can be done either before or after clarification and/or filtration of the scrubbing liquid in filter 92, in this embodiment (EMCO Process Equipment, Mississauga, Ontario). An alkaline buffer liquid for the control of scrubbing liquid pH is supplied to the scrubbing liquid circuit 54 from a buffer liquid storage tank 98 through metering pump 84 which is electrically connected to central controller 82 through conductor 84a. The storage tank 98 is provided with a mixing arrangement 100 for the constant or intermittent mixing of the buffer liquid, depending on the buffer liquid respectively used. The preferred buffer compounds are $Na_2CO_3$ and/or $NaHCO_3$, which are stored in an aqueous solution in the buffer liquid storage tank. Make-up water can be added to the buffer liquid storage tank 98 through a make-up water line 94 and make-up water valve 96. A scrubbing liquid bypass circuit 102 is provided in the scrubbing liquid circuit 54 which allows for maintenance and repair of the filter 92 as well as control of the scrubbing liquid throughput thereof.

Wet scrubbing towers of this principle construction and function have been used to clean the exhaust of various power plants (Tilsonburg District Memorial Hospital, Tilsonburg, ON; Ottawa Civic Hospital, Ottawa, ON; Gatineau Sewage Treatment Plant, Gatineau, PQ) rated from 20 to 60 MBtu/hr. All function to recover and utilize waste heat. In terms of antipollution performance, these scrubbing systems in general remove over 95% of particulates and substantially all of the $SO_x$ gases, but only up to 50% of the $NO_x$ gases. This performance is now improved by the addition of the phosphorus handling and injection system in accordance with the invention.

The $NO_x$ gases consist of $N_2O$, NO, and $NO_2$. The capture of each by a scrubber depends on its aqueous solubility and on the ease by which it can be transformed (through chemical interactions) in the aqueous phase. NO is the least soluble and $NO_2$ is the most soluble of the three $NO_x$ gases. Once in solution, $NO_2$ hydrolyzes with relative ease to form nitrite and nitrate ions as shown by reaction ii, $$2NO_2 + H_2O \longrightarrow NO_2^- + NO_3^- + 2H^+. \qquad \text{ii}$$

especially in the presence of a buffer designed to remove $H^+$ ions. The little NO that does dissolve in the scrubbing liquor can react with $NO_2$ to produce nitrites and nitrates as discussed above in relation to formula iii.

EXAMPLE

The system in accordance with the invention can be used with a boiler rated at 100 MBtu/hr emitting a flue gas stream of 21,000 cu. ft./MBtu at a temperature of 200° C., which contains 4% $O_2$ and 300 ppm of $NO_x$ (90% as NO). From this information, one obtains a total volume flow of 583 cu. ft./sec., containing NO at 0.16 cu.ft./sec (F. D. Friedrich & A. C. S. Hayden, "A Combustion Handbook", Vol. 2, Mines Branch Monograph 879, Information Canada, Ottawa, 1973). According to reaction iv.c shown above, the ozone content (volume flow) created in the flue gas stream must be at least equal to the NO content (volume flow). Using a conversion factor of 0.73 moles/cu.ft at 200° C., one calculates the required ozone (and NO) content as 0.115 moles/sec. Using a P/N molar ratio of 0.4, one calculates that P must be ejected into the flue gas stream at a rate of 0.05 moles/sec.

The phosphorus emulsion 39 is ejected from nozzle 41 (1% $P_4$/water emulsion) and dispersed by compressed air producing a flow of 20 cu.ft/min. at 60 psig (TurboSonic Inc. instructions). The ejected vapourized volume is then about 12 cu.ft/sec, producing about a 2% increase in the flue gas stream. Water vapour will account for most of the newly created volume flow. After the $P_4$/water emulsion is injected, the $O_2$ content of the flue gas (volume flow) will be (0.04)(583) cu.ft/sec. Since the ozone content is 0.16 cu.ft/sec, the $O_3/O_2$ ratio (w/w) is calculated to be about 1.0%. At this $O_3/O_2$ ratio, the ozone half-life ($t_{1/2}$) at 200° C. should be 4.5 seconds according to Table 2. If the velocity of flow is 30 ft/sec in the manifold 51 and 15 ft/sec in the scrubbing tower 52 (based on geometry) and if the $P_4$/water emulsion 39 is ejected at about 20 ft upstream of the inlet port 72 and if the 'scrubbing' length of the tower 52 is about 25 ft, then the total 'residence time', during which the $P_4/O_2/O_3$/NO interactions (iv) are contained, will be 2.3 seconds (about 0.7 sec in the manifold 51 and about 1.6 sec in the tower 52).

According to the pilot-scale experiments by Chang & Lee (1992), up to 90% of $NO_x$ was absorbed as $NO_2$ after a contact time between NO and $P_4$ (only in the scrubber chamber) of about 1.2 sec. No doubt, the rate limitations in the chain reactions (iv.a-c) in their experiments are to be found in a relatively low liquid/gas interphase surface area and in the relatively low $P_4$ partial pressure achieved at 80° C.

In the preferred system according to the invention, microdroplets are formed which helps to increase the liquid/gas interphase surface area. Also, since the temperature at the spray site will be about 200° C. to 250° C., one can expect to achieve a much higher $P_4$ partial pressure for interaction with $O_2$ and the creation of ozone (iv.a, iv.b). Therefore, the chain reactions (iv) should proceed to completion in a much shorter time than was observed with prior art processes and apparatus. In the preferred system of the invention, the $P_4$ to $NO_2$ reactions will be complete within about 1 second, thus before the flue gas comes into contact with the scrubbing liquid. During this time period, one can expect some of the $O_3$ to decompose, according to the simple exponential decay equation $(O_3)_t/(O_3)_o = \exp(-kt)$. Using this equation and the 4.5 sec half-life given in Table 2 (at 200° C.), one calculates that only about 14% of the $O_3$ will decay in the first second before it can interact with NO. Therefore, a large portion of the NO in the flue gas will be converted to $NO_2$ prior to entry of the flue gas into the scrubbing tower 52, i.e., before it comes into contact with the buffer liquid cascading down the packing of the tower.

When the scrubbing tower 52 is sized to recover up to 90% of the flue gas waste heat it has enough scrubbing liquid throughput to capture the more soluble gases ($NO_2$, $SO_2$) and organics, especially when the fuel is natural gas. The concomitant absorption by the scrubbing tower 52 of $P_4O_{10}$, its hydrolysis to phosphoric acid, and its neutralization by the circulating buffer in the scrubbing liquid is not expected to require any significant deviations from standard operating and design principles of conventional wet scrubbers.

The best defense against excess emission of $O_3$ and $P_4O_{10}$ to the atmosphere is a careful matching of $P_4$ ejection to NO content. Ozone is continuously monitored by an ozone sensor 46 located at the exhaust 70 of the scrubbing tower 52. NO, $O_2$, CO and $NO_2$ is continuously monitored proximal to and upstream of the $P_4$ ejection site with a gas sensor 47. The signals from these sensors are sent to the central controller 82 through electrical conductors 46a and 47a. The controller 82 in turn operates the modulating devices (metering pump 40, air compressor) in the $P_4$ injection system according to preselected $P_4$ to NO ratios stored in the controller.

The ozone content at the exhaust 70 is a good indicator of excess $P_4$, hence also excess $P_4O_{10}$, because the $O_3$ survival rate increases dramatically as its concentration decreases and as the temperature decreases (Table 2). The $P_4O_{10}$ content at the exhaust 70 will be lower than the excess $P_4O_{10}$ as determined from stoichiometry (iv), since the solubility of $P_4O_{10}$ is better than the solubility of $O_3$. Thus, the absorption rate of $P_4O_{10}$ in the scrubbing liquid relative to $O_3$ will be higher.

Reaction v.a shows the hydrolyzation of the last (others are similar) phosphorus oxide once it is absorbed into the liquid phase.

$$P_4O_{10} + 6H_2O \longrightarrow 4H_3PO_4 \qquad \text{v.a}$$

Since the scrubbing liquid will contain an alkali buffer, much of the $H_3PO_4$ will be in the $H_2PO_4^-$ form. Preselected amounts of lime stored in a chemical tank (not shown) will be added at 48 to the scrubbing liquid in the clarifier 92 to selectively precipitate $H_2PO_4^-$ as the very insoluble calcium phosphate (v.b)

$$2H_2PO_4^- + 3Ca(OH)_2 \longrightarrow Ca_3(PO_4)_2 + 4H_2O + 2OH^- \qquad \text{v.b}$$

Calcium phosphate can be sold, for example, to the fertilizer manufacturing industry which will allow further recovery of operating costs.

The principle difference between a wet scrubbing system of the prior art (Chang et al.) and the present process as well as the economic superiority of the latter is readily apparent from the amount of emulsion used per unit of the flue gas in the respective process, which is expressed by the L/G ratio. Chang et al. disclose a L/G ratio of 60–120 [USGal/min]/[1000ft³/min]. Using the data provided in the exemplary system of the present application, one calculates a L/G ratio of 0.07.

G: Gas flow rate is 583 ft³/sec or 34.98 units of 1000 ft³/min;
L: The rate of ejection of the emulsion is 0.05 mole $P_4$/sec, which translates into 2.4568 USGal/min with a 1% emulsion of $P_4$, 124 g $P_4$/mole of $P_4$, and 3,7854 1/USGal;
L/G=(2,4568 USGal/min)/(34.98×10³ft³/min)=0.07 USGal/1000 ft³ Thus, the amount of emulsion and, consequently, water injected into the flue gas in the exemplary process of the present invention is about 1000 times less than in the prior art method. Furthermore, the amount of water injected into the flue gas stream in the process of the present invention as part of the emulsion is very low and even when totally evapourated constitutes only about 2% of the total flue gas volume. Thus, injection of the emulsion in the present system cannot function as a wet scrubbing step. Moreover, the use of 1000 times less emulsion ensures complete incorporation of the water and phosphorus phases of the injected emulsion into the flue gas steam (as vapour and at least partially evapourated $P_4$). This also reduces the amount of $P_4$ consumed by the same factor of 1000, which renders the process much more efficient and economical and obviates the requirement for additional scrubbing liquid collecting, recirculating and processing equipment for the emulsion.

Changes and modifications in the specifically described embodiments can be carried out without departing from the scope of the invention which is intended to be limited only by the scope of the appended claims.

We claim:

1. A process for reducing the $NO_x$ content of a flue gas, comprising the steps of:

preparing an emulsion of liquid $P_4$ in water having a selected $P_4$/water ratio;

finely dispersing a metered amount of the emulsion in the flue gas at a location of injection, the location of injection being selected such that the temperature of the flue gas after injection of the metered amount is between about 180° C. and about 280° C., and the metered amount being selected so that the water phase of the emulsion substantially completely evapourates upon contact with the flue gas to initiate a parallel oxidation of $P_4$ and NO in the vapour phase of the flue gas;

removing $NO_2$ from the flue gas at a selected distance downstream from the location of injection by subjecting the flue gas to a wet scrubbing step, the distance being selected such that the parallel oxidation reaction is substantially separated in time and space from the wet scrubbing step;

monitoring the $O_3$ content of the flue gas at an exhaust of the scrubber; and adjusting at least one of the $P_4$/water ratio and the metered amount when $O_3$ is included in the flue gas at the exhaust so as to minimize the emission of ozone to the atmosphere.

2. The process of claim 1, comprising the further step of adjusting the flue gas temperature to the range of about 180° C. to about 280° C. prior to dispersing the emulsion in the flue gas.

3. The process of claim 2, wherein the temperature of the flue gas is upwardly adjusted if the flue gas temperature is below 180° by injection of superheated steam upstream of the location of injection and downwardly adjusted if the flue gas temperature is above 280° C. by increasing the amount of water per unit volume of emulsion and increasing the metered amount, while maintaining the amount of $P_4$ injected per unit volume of flue gas and ensuring that the water phase of the emulsion substantially completely evapourates upon contact with the flue gas.

4. The process of claim 1, wherein the step of preparing the emulsion comprises the steps of heating solid $P_4$ in a water bath to prevent contact of the phosphorus with air to a temperature above the melting point of phosphorus and below 280° C., and admixing the liquefied $P_4$ with water in the preselected ratio and under a $N_2$ atmosphere.

5. The process of claim 1, wherein the emulsion is dispersed in the form of microdroplets having an average diameter of 60 $\mu$m or less and in a spray profile selected to minimize contact of the $P_4$ with the manifold.

6. The process of claim 1, wherein the metered amount of the emulsion and the selected $P_4$/water ratio are adjusted such that the volume flow of $O_3$ in the flue gas, generated by oxidation of the $P_4$ in the vapour phase is at least equal to the volume flow of NO in the flue gas.

7. The process of claim 6, wherein the selected $P_4$/water ratio is 1/100.

8. The process of claim 6, wherein the selected distance is at least equal to the distance travelled by the flue gas during the time equal to the half-life of $O_3$ at the temperature of the flue gas at the point of injection.

9. The process of claim 1, wherein the location of injection is selected such that the flue gas temperature after injection of the emulsion is about 200° C.

* * * * *